US012784586B2

(12) United States Patent
Jain et al.

(10) Patent No.: US 12,784,586 B2
(45) Date of Patent: Nov. 3, 2026

(54) SYSTEMS AND METHODS TO DETECT DRIVER DROWSINESS

(71) Applicant: Ford Global Technologies, LLC, Dearborn, MI (US)

(72) Inventors: Yashanshu Jain, Dearborn, MI (US); Ankita Ray, Westland, MI (US); Nikole Sekula, Berkley, MI (US); Suman Ravichandran, Commerce Township, MI (US); Nikita Kakade, Farmington Hills, MI (US); Eddie O. Abinoja, Novi, MI (US)

( * ) Notice: Subject to any disclaimer, the term of this patent is extended or adjusted under 35 U.S.C. 154(b) by 153 days.

(21) Appl. No.: 18/827,156

(22) Filed: Sep. 6, 2024

(65) Prior Publication Data

US 2026/0073790 A1 Mar. 12, 2026

(51) Int. Cl.
*G08G 1/0962* (2006.01)
*G08G 1/01* (2006.01)

(52) U.S. Cl.
CPC ....... *G08G 1/09626* (2013.01); *G08G 1/0112* (2013.01); *G08G 1/0129* (2013.01)

(58) Field of Classification Search
CPC . G08G 1/09626; G08G 1/0112; G08G 1/0129
See application file for complete search history.

(56) References Cited

U.S. PATENT DOCUMENTS 7,397,382 B2 7/2008 Ikegami et al.
8,098,165 B2 1/2012 Demirdjian et al.
8,519,853 B2 8/2013 Eskandarian et al.
9,460,601 B2 10/2016 Mimar
10,825,339 B2 11/2020 Bjersing et al.
2020/0156440 A1* 5/2020 Matsuoka ............ G06V 20/597
2023/0347903 A1* 11/2023 Katz .................... G06V 20/597
2025/0239154 A1* 7/2025 Enz ........................ G06V 20/58

OTHER PUBLICATIONS

Muhammad Ramzan, et al., A Survey on State-Of-The-Art Drowsiness Detection Techniques, IEEE Access, https://ieeexplore.ieee.org/document/8704263, May 1, 2019, pp. 61904-61919.

* cited by examiner

*Primary Examiner* — Daryl C Pope
(74) *Attorney, Agent, or Firm* — Frank Lollo; Eversheds Sutherland (US) LLP

(57) ABSTRACT

A vehicle including a first driver drowsiness detection unit, a second driver drowsiness detection unit and a processor is disclosed. The first driver drowsiness detection unit may be configured to capture a first input associated with a lane-based driving behavior of a vehicle driver, and the second driver drowsiness detection unit may be configured to capture a second input associated with driver facial cues and body position. The processor may be configured to correlate the first input and the second input, and determine a driver drowsiness confidence level based on the correlation. The processor may classify that the vehicle driver may be drowsy when the driver drowsiness confidence level is greater than a threshold confidence value. Responsive to determining that the vehicle driver may be drowsy, the processor may output a notification.

18 Claims, 5 Drawing Sheets

SYSTEMS AND METHODS TO DETECT DRIVER DROWSINESS

FIELD

The present disclosure relates to systems and methods to detect driver drowsiness while driving a vehicle.

BACKGROUND

It is known that drowsy or distracted vehicle driving may lead to adverse situations. There exist driver assistance features/systems in many modern vehicles which provide notifications to a driver when the driver may be drowsy or distracted. Such systems determine whether the driver is exhibiting behavior that could indicate that the driver is drowsy or distracted while driving the vehicle, and output notifications to alert the driver when the driver is drowsy or distracted. Some systems capture driver's facial cues or body movements to determine whether the driver is drowsy or distracted, while other systems analyze vehicle movement relative to lane markers on a road network to ascertain driver's possible drowsiness. However, the conventional systems may not output accurate notifications/alerts in some scenarios based on driver's state.

Thus, there exists an opportunity to build a system that accurately determines whether the driver is drowsy or distracted, and accordingly outputs notifications, thereby enhancing driving experience.

BRIEF DESCRIPTION OF THE DRAWINGS

The detailed description is set forth with reference to the accompanying drawings.

The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
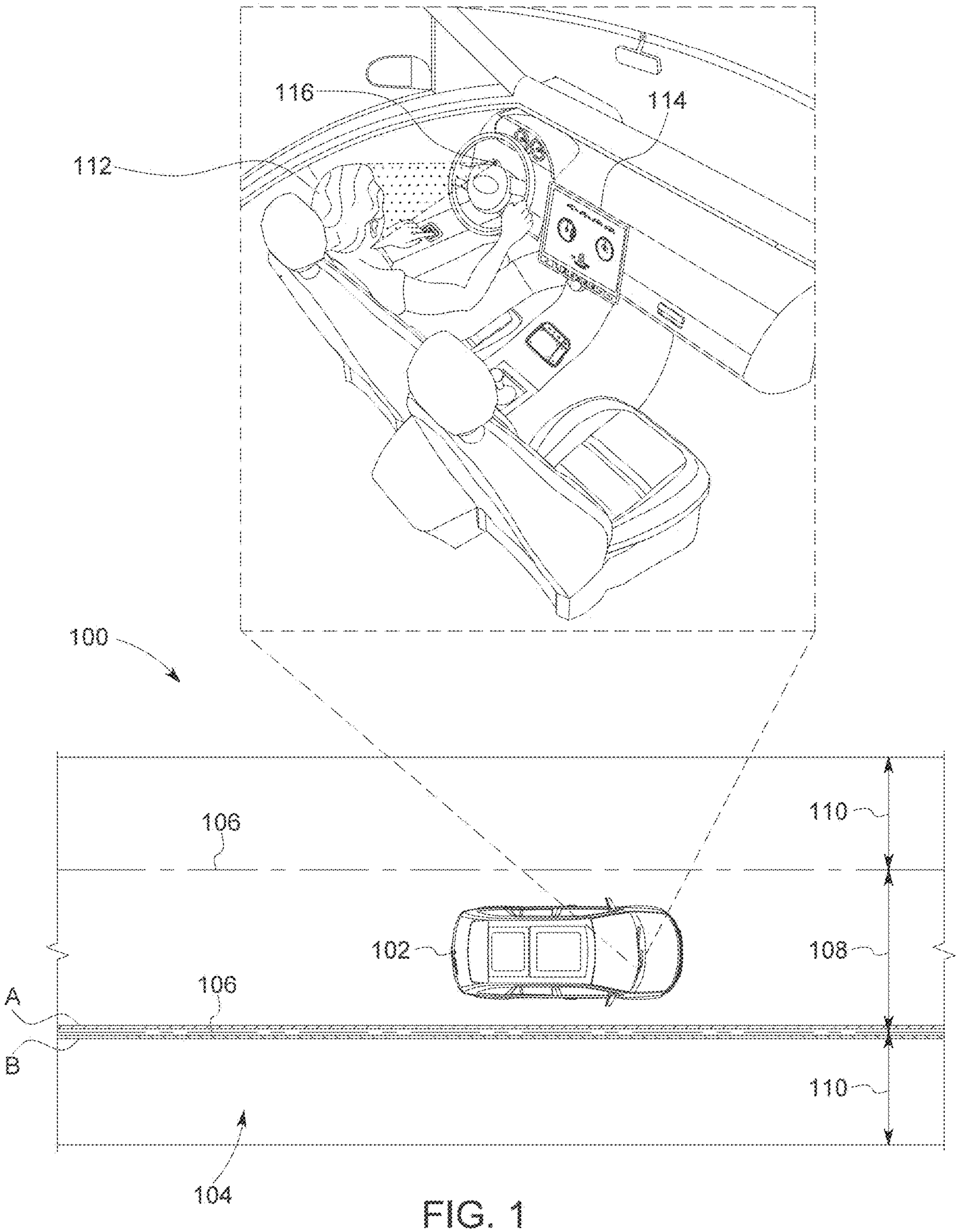
FIG. 1 depicts an environment in which techniques and structures for providing the systems and methods disclosed herein may be implemented.

The present disclosure describes a vehicle's driver assistance feature (or system) that may assist a vehicle driver in efficiently driving the vehicle on a road network. The system may determine whether the vehicle driver may be drowsy or distracted while driving, and may output/issue notifications or alerts to the vehicle driver when the vehicle driver may be drowsy or distracted. In some aspects, the system may include a processor that may obtain input signals from multiple detection units, correlate the input signals, and determine whether the vehicle driver may be drowsy or distracted based on the correlation. The type of notification that is output by the system may be based on whether the vehicle driver is determined to be drowsy or distracted.

In some aspects, the detection units may capture inputs associated with lane-based driving behavior (e.g., by using vehicle front vision camera) associated with the vehicle driver, driver's facial cues and body position (e.g., by using driver facing camera), and/or the like. The processor may obtain the inputs from the detection units, correlate the inputs, and determine a driver drowsiness confidence level based on the correlation of the input signals. The processor may output the notification when the driver drowsiness confidence level may be greater than a threshold value. In further aspects, the processor may determine an impairment level (e.g., based on the inputs obtained from the driver facing camera), and may select the notification, from a plurality of notifications, that the processor outputs based on the determined impairment level. The processor may escalate the notification/alert issuance (e.g., increase the volume and/or frequency associated with the notification) when the impairment level increases over time, and may suppress the notification/alert issuance when the impairment level decreases over time.

In additional aspects, the processor may obtain inputs from the vehicle front vision camera, and determine whether the vehicle may be driving in a host lane monitoring zone for a first time duration greater than a host lane threshold, or driving in an adjacent lane monitoring zone for a second time duration greater than an adjacent lane threshold. The processor may determine/classify that the vehicle driver may be drowsy when the first time duration may be greater than the host lane threshold, or the second duration may be greater than the adjacent lane threshold.

In further aspects, the processor may obtain inputs from the driver facing camera, and determine impairment level based on the obtained inputs from an algorithm that is based on Karolinska Sleepiness Scale (KSS). Based on the determined impairment level, the processor may output a drowsiness associated notification. In an exemplary aspect, the processor may output the drowsiness associated notification when the impairment level is between KSS level of 7-9.

In further aspects, the processor may distinguish between driver's drowsiness state or a distracted state based on the correlation of the inputs obtained from the detection units. The processor may output the drowsiness associated notification when the vehicle driver may be drowsy, or output a distracted/attention associated notification when the vehicle driver may be distracted. The drowsiness associated notification may be different from the distracted associated notification.

The present disclosure discloses a driver assistance system that enhances driver's experience of driving the vehicle. Since the system uses inputs from multiple detection units, the system more accurately determines if the vehicle driver is drowsy or not (i.e., the system reduces false positive and increases true positive results). Further, the system outputs/issues notifications or alerts in a controlled manner, e.g., the system may reissue alerts (if required, e.g., when the vehicle driver behavior still indicates that the vehicle driver is drowsy/distracted) only after a predetermined time duration (e.g., after every 15 minutes) to prevent issuance of multiple alerts in a short amount of time. In addition, the system distinguishes between drowsiness state and distracted state of the vehicle driver, and outputs notification based on whether the driver is drowsy or distracted, which may further prevent issuance of multiple alerts. Further, the system escalates the notifications/alerts when the driver's impairment level (or drowsiness level) increases over time, thereby ensuring that the driver does not miss the notifications/alerts.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may traveling on a road network 104. The vehicle 102 may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, the vehicle 102 may include any powertrain such as a gasoline engine, one or more electrically-actuated motor(s), a hybrid system, etc.

The road network 104 may include a plurality of lane markers 106 that may divide the road network 104 in a plurality of lanes. The plurality of lanes may include a host lane 108 (in which the vehicle 102 may be traveling, as shown in FIG. 1) and adjacent lanes 110 that may be adjacent to the host lane 108. The plurality of lane markers 106 may assist a vehicle driver 112 to drive the vehicle 102 straight or linearly in a single lane (e.g., the host lane 108).

The vehicle 102 may include a driver assistance system (shown as driver assistance system 210 in FIG. 2) that may be configured to assist the vehicle driver 112 in driving the vehicle 102 on the road network 104. Specifically, the driver assistance system ("system") may be configured to determine whether the vehicle driver 112 may be drowsy or distracted while driving, and output one or more notifications or alerts to the vehicle driver 112 via a vehicle Human-Machine Interface (HMI) 114 when the vehicle driver 112 may be drowsy or distracted. The notifications or alerts may include audio notifications and/or visual notifications, which may enable the vehicle driver 112 to stay alert or regain attention while driving the vehicle 102.

In some aspects, the system may include a plurality of detection units (shown as detection units 246 in FIG. 2) that may detect whether the vehicle driver 112 may be drowsy or distracted. In an exemplary aspect, the plurality of detection units may include a first driver drowsiness detection unit and a second driver drowsiness detection unit. The first driver drowsiness detection unit may capture a first input associated with the vehicle driver 112 by using a vehicle front vision camera (shown as front vision camera 238 in FIG. 2), and the second driver drowsiness detection unit may capture a second input associated with the vehicle driver 112 by using a driver facing camera 116 installed in a vehicle interior portion, to detect whether the vehicle driver 112 may be drowsy while driving the vehicle 102. The first input may be associated with a lane-based driving behavior associated with the vehicle driver 112, and the second input may be associated with driver facial cues and body position. As an example, the first driver drowsiness detection unit may detect whether the vehicle 102 is straddling the adjacent lane 110 while being in the host lane 108, oscillating within the host lane 108, departing the host lane 108 to make a lane change but never completing it for a long time duration or even driving out of the host lane 108 altogether, and/or the like. The second driver drowsiness detection unit may detect whether the vehicle driver 112 is yawning, closing eyes, moving/drooping head, and/or the like.

The system may further include a processor (shown as processor 242 in FIG. 2) that may be configured to obtain the first input and the second input from the first driver drowsiness detection unit and the second driver drowsiness detection unit respectively, and correlate the first input and the second input. Based on the correlation of the first input and the second input, the processor may determine a driver drowsiness confidence level, and compare the driver drowsiness confidence level with a predetermined threshold value. The processor may determine/classify that the vehicle driver 112 may be drowsy based on the comparison, and output a notification (e.g., a drowsiness associated notification/alert) via the HMI 114 responsive to determining that the vehicle driver 112 may be drowsy.

As an example, the processor may determine that the vehicle driver 112 may be drowsy when the driver drowsiness confidence level may be greater than the predetermined threshold value. In this case, the processor may output a notification/alert via the HMI 114 stating "Fatigue detected. Drive with care" and/or with a chime, to alert the vehicle driver 112 and prevent any adverse situation. In some aspects, the processor may determine that the driver drowsiness confidence level may be high (or greater than the predetermined threshold value) when the vehicle 102 is straddling the adjacent lane 110 while still being in the host lane 108, and the driver's eyes are closing. On the other hand, the processor may determine that the driver drowsiness confidence level may be low (or less than the predetermined threshold value) when the vehicle 102 has contacted the adjacent lane 110 once without shifting to the adjacent lane 110, and the driver's eyes are completely open. In such cases, the system may output the notification/alert in the first scenario (e.g., when the driver drowsiness confidence level is high), and may not output the notification/alert in the second scenario (e.g., when the driver drowsiness confidence level is low). In this manner, the processor provides accurate/relevant alert to the vehicle driver 112, thereby enhancing driver experience while driving the vehicle 102.

The plurality of detection units may further include a driver attention detection unit that may detect whether the vehicle driver 112 may be distracted while driving the vehicle 102. The driver attention detection unit may capture a third input associated with the vehicle driver 112 by using the driver facing camera 116. The third input may be associated with the driver facial cues and body position. In some aspects, the third input may be same as or different from the second input. In an exemplary aspect, the driver attention detection unit may detect that the vehicle driver 112 may be using phone or smoking accessories, or not attentive on the road network 104 while driving the vehicle 102 by using the driver facing camera 116.

In some aspects, the processor may correlate the first input, the second input, and the third input, and determine that the vehicle driver 112 may be drowsy or distracted based on the correlation of the first input, the second input, and the third input. Stated another way, the processor may distinguish between drowsiness state and distracted state of the vehicle driver 112 based on the correlation. The processor may then output the drowsiness associated notification when the vehicle driver 112 may be drowsy, or output a distracted state associated notification when the vehicle driver 112 may be distracted. The drowsiness associated notification may be different from the distracted associated notification. For example, when it could appear the vehicle driver 112 suddenly closes eyes for a few seconds, but is driving properly in the host lane 108 (without contacting the adjacent lane 110) and no other signal of being drowsy is detected, the processor may determine that the vehicle driver 112 may be distracted (e.g., using phone). In this case, the processor may output the distracted state associated notification stating "watch the road", and may not output any drowsiness associated notification. In addition, in this case, the processor may activate continuous chime until the vehicle driver 112 is attentive again (e.g., till the vehicle driver 112 looks at the road). In this manner, the system outputs relevant notifications that are based on the vehicle driver's state, thereby enhancing the driver's driving experience.

Further vehicle details are described below in conjunction with FIG. 2.

The vehicle 102, the vehicle driver 112, and/or the system may implement and/or perform operations, as described here in the present disclosure, in accordance with the owner manual and safety guidelines. In addition, any action taken by the vehicle driver 112 based on the notifications/recommendations provided by the vehicle 102 should comply with all the rules specific to the vehicle location and vehicle operation (e.g., Federal, state, country, city, etc.). The notifications/recommendations, as provided by the vehicle 102, should be treated as suggestions and only followed according to any rules specific to the vehicle location and vehicle operation.

Figure 2:
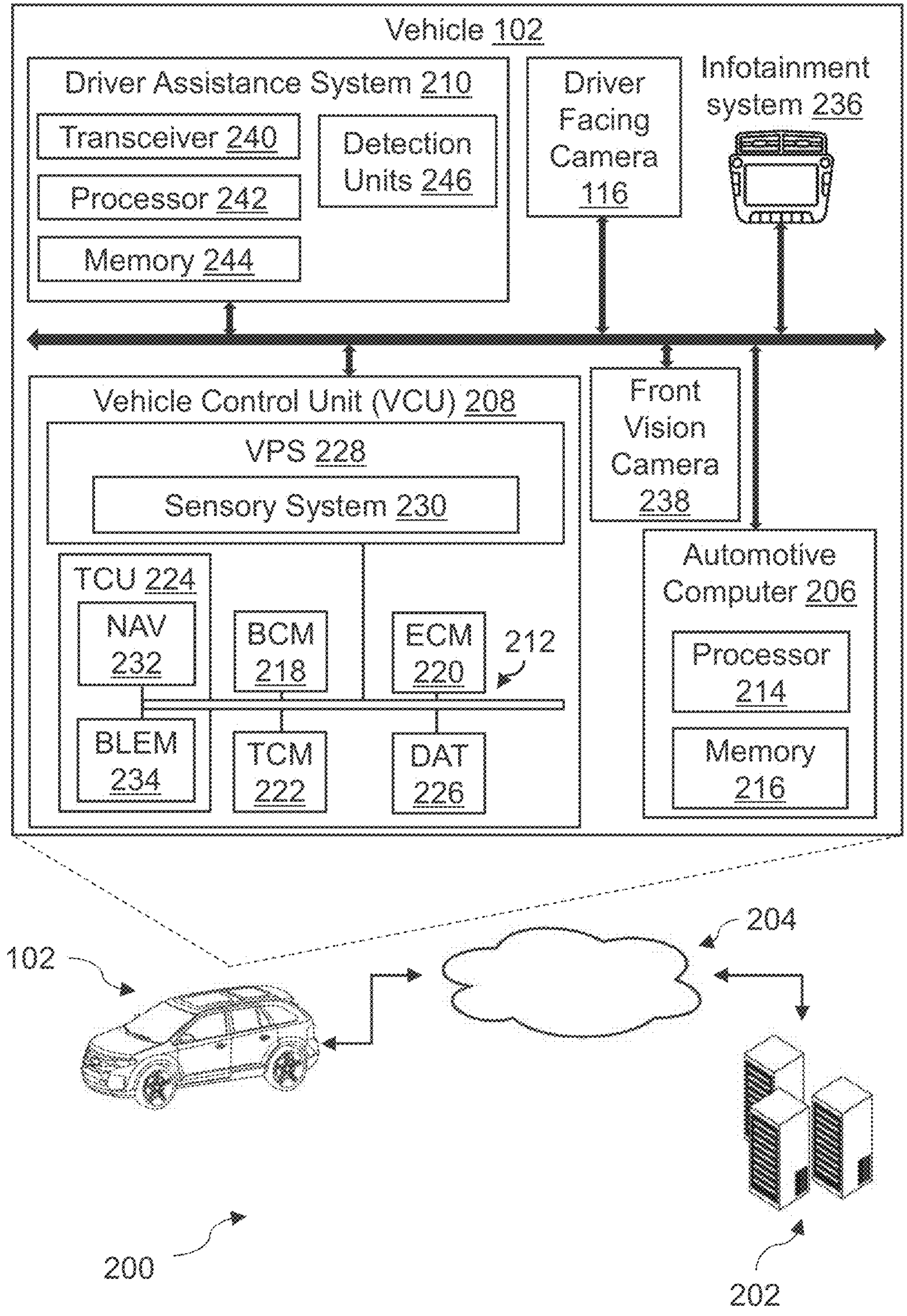
FIG. 2 depicts a block diagram of a system to detect driver's drowsiness in accordance with the present disclosure.

FIG. 2 depicts a block diagram of a system 200 to detect driver's drowsiness in accordance with the present disclosure. FIG. 2 will be explained in conjunction with FIGS. 3-4.

The system 200 may include the vehicle 102 and one or more servers 202 (or a server 202) communicatively coupled with each other via one or more networks 204. The server 202 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet.

In further aspects, the server 202 may be configured to receive information associated with the vehicle driver 112, and store the information. For example, the server 202 may store driver historical behavior information associated with the vehicle driver 112. The driver historical behavior information may include, but is not limited to, information associated with historical notifications outputted to the vehicle driver 112, driver's driving behavior (e.g., whether the vehicle driver 112 usually drives the vehicle 102 in a host lane 108 center or near to a host lane edge), and/or the like. In addition, the server 202 may store information associated with the road network 104. For example, the server 202 may store information associated with road curvature, lane markers 106 availability on the road network 104, availability of roads, and/or the like.

The server 202 may provide the above-mentioned information to the vehicle 102 at a predefined frequency, or when the vehicle 102 transmits a request to the server 202 to obtain such information.

The network(s) 204 illustrates an example communication infrastructure in which the connected devices discussed in various embodiments of this disclosure may communicate. The network(s) 204 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 206, a Vehicle Control Unit (VCU) 208, and a driver assistance system 210 (or system 210). The VCU 208 may include a plurality of Electronic Control Units (ECUs) 212 in communication with the automotive computer 206.

In some aspects, the automotive computer 206 and/or the system 210 may be installed anywhere in the vehicle 102, in accordance with the disclosure. Further, the automotive computer 206 may operate as a functional part of the system 210. The automotive computer 206 may be or include an electronic vehicle controller, having one or more processor(s) 214 and a memory 216. Moreover, the system 210 may be separate from the automotive computer 206 (as shown in FIG. 2) or may be integrated as part of the automotive computer 206.

The processor(s) 214 may be in communication with one or more memory devices in communication with the respective computing systems (e.g., the memory 216 and/or one or more external databases not shown in FIG. 2). The processor(s) 214 may utilize the memory 216 to store programs in code and/or to store data for performing aspects in accordance with the disclosure. The memory 216 may be a non-transitory computer-readable medium or memory storing a driver assistance program code. The memory 216 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 208 may share a power bus with the automotive computer 206 and may be configured and/or programmed to coordinate the data between vehicle 102 systems, connected servers (e.g., the server(s) 202), and other vehicles (not shown in FIG. 2) operating as part of a vehicle fleet. The VCU 208 may include or communicate with any combination of the ECUs 212, such as a Body Control Module (BCM) 218, an Engine Control Module (ECM) 220, a Transmission Control Module (TCM) 222, a Telematics Control Unit (TCU) 224, a Driver Assistances Technologies (DAT) controller 226, etc. The VCU 208 may further include and/or communicate with a Vehicle Perception System (VPS) 228, having connectivity with and/or control of one or more vehicle sensory system(s) 230. The vehicle sensory system 230 may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, temperature sensors, wheel sensors, ambient weather sensors, vehicle internal and external cameras, one or more rain sensors, capacitive moisture sensors, a tire pressure sensor, ultrasonic sensors, etc. In some aspects, the vehicle sensory system 230 may include the driver facing camera 116 that may be installed inside the vehicle 102 to capture driver facial cues and body position. In addition, the vehicle sensory system 230 may include a front vision camera (e.g., a front vision camera 238 shown in FIG. 2) configured to detect the lane markers 106 on the road network 104.

In some aspects, the VCU 208 may control vehicle operational aspects and implement one or more instruction sets received from a user device (not shown) associated with the vehicle driver 112, from one or more instruction sets stored in the memory 216, including instructions operational as part of the system 210.

The TCU 224 may be configured and/or programmed to provide vehicle connectivity to wireless computing systems onboard and off board the vehicle 102 and may include a Navigation (NAV) receiver 232 for receiving and processing a GPS signal, a BLE Module (BLEM) 234, a Wi-Fi transceiver, an Ultra-Wideband (UWB) transceiver, and/or other wireless transceivers (not shown in FIG. 2) that may be configurable for wireless communication (including cellular communication) between the vehicle 102 and other systems (e.g., the user device associated with the vehicle driver 112, a key fob, etc.), computers, and modules. The TCU 224 may be in communication with the ECUs 212 by way of a bus.

The ECUs 212 may control aspects of vehicle operation and communication using inputs from human drivers, inputs from an autonomous vehicle controller, the system 210, and/or via wireless signal inputs received via the wireless connection(s) from other connected devices, such as the server(s) 202, among others.

The BCM 218 generally includes integration of sensors, vehicle performance indicators, and variable reactors associated with vehicle systems and may include processor-based power distribution circuitry that can control functions associated with the vehicle body such as lights, windows, security, camera(s), headlights, audio system(s), speakers, wipers, door locks and access control, and various comfort controls. The BCM 218 may also operate as a gateway for bus and network interfaces to interact with remote ECUs (not shown in FIG. 2).

The DAT controller 226 may provide Level-1 through Level-3 automated driving and driver assistance functionality that may include, for example, active parking assistance, vehicle backup assistance, and adaptive cruise control, among other features. The DAT controller 226 may also provide aspects of user and environmental inputs usable for user authentication.

In some aspects, the automotive computer 206 may connect with an infotainment system 236 (or a vehicle Human-Machine Interface (HMI), same as the HMI 114). The infotainment system 236 may include a touchscreen interface portion and may include voice recognition features, biometric identification capabilities that can identify users based on facial recognition, voice recognition, fingerprint identification, or other biological identification means. In other aspects, the infotainment system 236 may be further configured to receive user instructions/inputs via the touchscreen interface portion and/or display notifications/recommendations (e.g., display notifications generated by the system 210), navigation maps, etc. on the touchscreen interface portion.

The computing system architecture of the automotive computer 206, the VCU 208, and/or the system 210 may omit certain computing modules. It should be readily understood that the computing environment depicted in FIG. 2 is an example of a possible implementation according to the present disclosure, and thus, it should not be considered limiting or exclusive.

In accordance with some aspects, the system 210 may be integrated with and/or executed as part of the ECUs 212. The system 210, regardless of whether it is integrated with the automotive computer 206 or the ECUs 212, or whether it operates as an independent computing system in the vehicle 102, may include a transceiver 240, a processor 242, a computer-readable memory 244, and a plurality of detection units 246. The detection units 246 may include the first driver drowsiness detection unit, the second driver drowsiness detection unit, and the driver attention detection unit, described above in conjunction with FIG. 1.

The transceiver 240 may be configured to receive information/inputs from one or more external devices or systems, e.g., the server(s) 202, the user device, and/or the like via the network 204. For example, the transceiver 240 may receive the information associated with the vehicle 102, the vehicle driver 112, the road network 104, etc. described above from the server 202 via the network 204. Further, the transceiver 240 may transmit notifications (e.g., alert/alarm signals) to the external devices or systems. In addition, the transceiver 240 may be configured to receive information/inputs from vehicle 102 components such as the infotainment system 236, the vehicle sensory system 230 (including the driver facing camera 116 and the front vision camera 238), the TCU 224, and/or the like. Further, the transceiver 240 may transmit notifications (e.g., alert/alarm/command signals) to the vehicle 102 components such as the infotainment system 236, the BCM 218, etc.

The processor 242 and the memory 244 may be the same as or similar to the processor 214 and the memory 216, respectively. In some aspects, the processor 242 may utilize the memory 244 to store programs in code and/or to store data for performing aspects in accordance with the disclosure. The memory 244 may be a non-transitory computer-readable medium or memory storing the driver assistance program code. In some aspects, the memory 244 may be configured to store the information associated with the vehicle 102, the vehicle driver 112, the road network 104, etc., which the vehicle 102 obtains from the server 202 or other devices.

In operation, when the vehicle 102 may be traveling on the road network 104, the vehicle driver 112 may activate a driver assistance feature via the infotainment system 236, or the driver assistance feature may automatically get activated when the vehicle 102 is being driven. In some aspects, the processor 242 may commence to obtain inputs from the detection units 246 when the driver assistance feature may be activated. For example, the processor 242 may obtain the first input from the first driver drowsiness detection unit and the second input from the second driver drowsiness detection unit, when the driver assistance feature may be activated. As described above in FIG. 1, the first driver drowsiness detection unit may capture the first input associated with the lane-based driving behavior associated with the vehicle driver 112 (e.g., by using the front vision camera 238), and the second driver drowsiness detection unit may capture the second input associated with the driver facial cues and body position (e.g., by using the driver facing camera 116).

Responsive to obtaining the first input and the second input, the processor 242 may correlate the first input and the second input, and determine a driver drowsiness confidence level based on the correlation of the first input and the second input. The driver drowsiness confidence level may indicate a probability of vehicle driver 112 drowsiness. Responsive to determining the driver drowsiness confidence level, the processor 242 may compare the driver drowsiness confidence level with a predetermined threshold value (that may be pre-stored in the memory 244). The processor 242 may determine that the vehicle driver 112 may be drowsy based on the comparison. In some aspects, the processor 242 may determine that the vehicle driver 112 may be drowsy when the driver drowsiness confidence level may be greater than the predetermined threshold value. For example, when both the first input and the second input indicate that the vehicle driver 112 may be drowsy, the processor 242 may determine that the driver drowsiness confidence level may be high (or greater than the predetermined threshold value). On the other hand, when the first input indicates that the vehicle driver 112 may be drowsy but the second input indicates that the vehicle driver 112 may be alert (and not drowsy), the processor 242 may determine that the driver drowsiness confidence level may be low or medium (or less than the threshold value).

In some aspects, to determine the driver drowsiness confidence level, the processor 242 may determine a first confidence level associated with the driver's drowsiness based on the first input, and a second confidence level associated with the driver's drowsiness based on the second input. Responsive to such determination, the processor 242 may correlate the first confidence level and the second confidence level, and may determine the driver drowsiness confidence level based on the correlation of the first confidence level and the second confidence level. In some aspects, the driver drowsiness confidence level may be high when both the first confidence level and the second confidence level are high. Stated another way, the probability that the vehicle driver 112 is drowsy may be high when both the first confidence level and the second confidence level are high. The process of determination of the first confidence value and the second confidence value may be understood in conjunction with FIGS. 3 and 4 described later below.

In some aspects, the processor 242 may obtain the first input and the second input simultaneously. Alternatively, the processor 242 may obtain the first input, determine that the vehicle driver 112 may be drowsy based on the first input. Responsive to determining that the vehicle driver 112 may be drowsy based on the first input, the processor 242 may obtain the second input and then perform the correlation of the first input and the second input to determine whether the vehicle driver 112 may be drowsy with greater confidence.

Responsive to determining that the vehicle driver 112 may be drowsy (i.e., when the driver drowsiness confidence level may be greater than the predetermined threshold value), the processor 242 may output a notification/alert (e.g., a first drowsiness associated notification) for the vehicle driver 112. The notification may be an audio signal and/or a visual signal on the infotainment system 236 or the user device associated with the vehicle driver 112. In further aspects, in addition to comparing the driver drowsiness confidence level with the predetermined threshold value as described above, the processor 242 may monitor an impairment level (or a drowsiness level) associated with the vehicle driver 112 based on the second input. The processor 242 may further select an optimal alert notification (i.e., the first drowsiness associated notification), from a plurality of notifications, for the vehicle driver 112 based on the impairment level. For example, the processor 242 may monitor and determine whether the vehicle driver 112 may be drowsy, most drowsy, microsleep, or asleep (which may be examples of different impairment levels) based on the second input. Based on such determination, the processor 242 may select a notification message (e.g., "fatigue detected"), a chime type (e.g., chime 1 for drowsy or most drowsy, and chime 2 for microsleep or asleep), chime frequency (e.g., frequency 1 for drowsy and most drowsy, frequency 2 for microsleep, and frequency 3 for asleep), chime volume (e.g., low volume for drowsy, medium volume for most drowsy, microsleep, and high volume for asleep), and/or the like.

The processor 242 may be further configured to monitor the impairment level associated with the vehicle driver 112 over time, and may escalate notifications/alerts (e.g., increase frequency, volume, etc.) when the impairment level increases, and may suppress issuance of subsequent notifications when the impairment level decreases. Stated another way, the processor 242 may evaluate the transition of the impairment levels when the vehicle driver 112 may be driving the vehicle 102, and may control issuance of subsequent alerts/notifications based on the evaluation. For example, when the vehicle driver 112 may be alert, the processor 242 may not issue any notification/alert on the infotainment system 236. When the processor 242 determines that the impairment level may be drowsy, the processor 242 may issue a first notification (e.g., chime 1 with low volume) and may maintain the first notification until a suppression threshold is reached. Once the first notification is issued, the processor 242 may not issue a second notification as long as the impairment level remains the same or becomes less, to prevent issuance of multiple alerts. The processor 242 may remove the alert (e.g., the first notification) or stop the alert once the suppression threshold is reached.

In some aspects, when the processor 242 determines that the impairment level has increased from drowsy to most drowsy, the processor 242 may issue a second notification or a subsequent alert notification. The second notification may be different from the first notification. For example, the second notification may include chime 2 with medium volume. In a similar manner, when the processor 242 determines that the impairment level has increased from most drowsy to asleep, the processor 242 may issue a third notification that may be different from the first notification and the second notification. For example, the processor 242 may activate continuous chime until the vehicle driver 112 opens the eyes. In further aspects, when the processor 242 determines that the impairment level has decreased from asleep to most drowsy or from most drowsy to drowsy, the processor 242 may suppress issuance of next or subsequent notifications/alerts.

Figure 3:
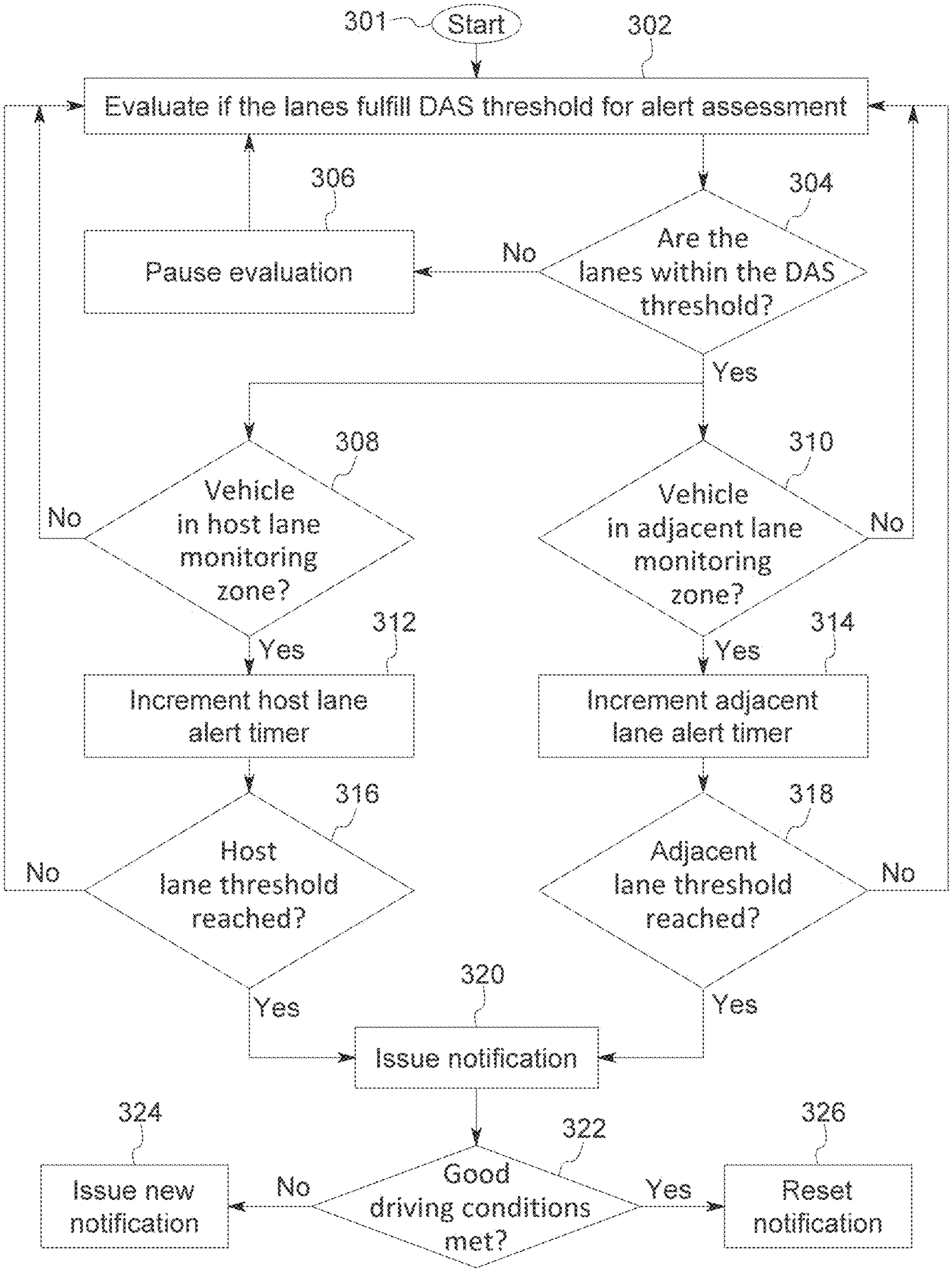
FIG. 3 depicts a flow diagram of a first method to detect driver's drowsiness using a first driver drowsiness detection unit, in accordance with the present disclosure.

In some aspects, to determine the first confidence level (described above) based on the first input, the processor 242 may obtain the first input, and perform the steps illustrated in FIG. 3. The steps shown in FIG. 3 may start at step 301. The processor 242 may first determine whether the feature activation condition is met or Interior First Row Camera (IFRC) signals are not faulted. Responsive to a determination that the feature activation condition is not met or the IFRC signals are faulted, the processor 242 may not issue any alert notification or remove the alert notification (e.g., any existing alert notification that may be getting output). On the other hand, responsive to a determination that the feature activation condition is met or the IFRC signals are not faulted, the processor 242 may evaluate if the lanes on the road network 104 fulfill Driver-Alert System (DAS) threshold for alert assessment based on the first input, at step 302. At step 304, the processor 242 may determine whether the lanes are within the DAS threshold. For example, the processor 242 may determine whether the lane markers 106 are available or visible on the road network 104, whether the roads are available based on the information associated with the road network 104 stored on the memory 244 (or the server 202). In addition, the processor 242 may evaluate whether the front vision camera 238 is able to detect the lane markers 106 based on the obtained first input. Responsive to determining that the lanes are not within the DAS threshold, the processor 242 may pause the evaluation, as shown in step 306, and continue to evaluate till the lanes fulfill DAS threshold, as shown in step 302.

Alternatively, responsive to determining that the lanes are within the DAS threshold, the processor 242 may determine/monitor whether the vehicle 102 may be traveling in a host lane monitoring zone (shown as zone "A" in FIG. 1) or an adjacent lane monitoring zone (shown as zone "B" in FIG. 1) based on the first input, as shown in steps 308 and 310. The host lane monitoring zone may be a host lane 108 area that may be located at a host lane edge (that may contact the adjacent lane 110). Similarly, the adjacent lane monitoring zone may be an adjacent lane 110 area that may be located at an adjacent lane edge (that may contact the host lane 108). In some aspects, if the vehicle 102 is traveling in the host lane monitoring zone, it may indicate that the vehicle 102 is traveling close to the adjacent lane 110, although the vehicle 102 is still in the host lane 108. On the other hand, if the vehicle 102 is traveling in the adjacent lane monitoring zone, it may indicate that the vehicle 102 has already crossed (or partially crossed) into the adjacent lane 110. In this case, a first vehicle part may be in the host lane 108 and a second vehicle part may be in the adjacent lane 110. In some situations, when the vehicle 102 is traveling in the host lane monitoring zone or the adjacent lane monitoring zone, the vehicle 102 may cause inconvenience to other vehicles traveling in the adjacent lane 110.

Responsive to determining that the vehicle 102 is not traveling in the host lane monitoring zone or the adjacent lane monitoring zone (meaning that the vehicle 102 is optimally traveling in or in proximity to the host lane 108 center), the processor 242 may continue to evaluate if the lanes fulfill DAS threshold, as shown in step 302. On the other hand, when the processor 242 determines that the vehicle 102 may be traveling in the host lane monitoring zone, the processor 242 may increment a host lane alert timer at step 312, and calculate a first time duration for which the vehicle 102 may be traveling in the host lane monitoring zone. Similarly, when the processor 242 determines that the vehicle 102 may be traveling in the adjacent lane monitoring zone, the processor 242 may increment an adjacent lane alert timer at step 314, and calculate a second time duration for which the vehicle 102 may be traveling in the adjacent lane monitoring zone.

When the vehicle 102 may be traveling in the host lane monitoring zone, the processor 242 may then compare the first time duration with a host lane threshold, and determine if the first time duration has reached the host lane threshold based on the comparison, as shown in step 316. Alternatively, when the vehicle 102 may be traveling in the adjacent lane monitoring zone, the processor 242 may compare the second time duration with an adjacent lane threshold, and determine if the second time duration has reached the adjacent lane threshold has reached based on the comparison, as shown in step 318. In some aspects, the processor 242 may determine the first confidence value associated with the first input based on the comparison of the first time duration with the host lane threshold, and the comparison of the second time duration with the adjacent lane threshold. The first confidence level may be high (e.g., greater than respective threshold values) when the first time duration is greater than the host lane threshold, or when the second time duration is greater than the adjacent lane threshold. High first confidence level may indicate that the vehicle driver 112 may be drowsy based on the first input (or the input obtained from the first drowsiness detection unit), as the vehicle driver 112 may be driving the vehicle 102 close to the host lane 108 edge or the vehicle 102 may have already crossed into the adjacent lane 110.

When the processor 242 determines that the first time duration is greater than the host lane threshold (or the host lane threshold is reached) or the second time duration is greater than the adjacent lane threshold (or the adjacent lane threshold is reached), the processor 242 may output/issue the drowsiness associated notification/alert, as shown in step 320. Stated another way, the processor 242 may issue the drowsiness associated notification/alert when the first confidence level is high.

In further aspects, to determine the first confidence value, the processor 242 may additionally perform short term assessments and long-term assessments of the vehicle movement. In the short term assessments, the processor 242 may monitor and judge the driving behavior associated with the vehicle driver 112 for a short time duration, such as 1-2 minutes, when the vehicle 102 may be traveling in the host lane monitoring zone or the adjacent lane monitoring zone. In the long term assessments, the processor 242 may monitor and judge the driving behavior associated with the vehicle driver 112 for a long time duration, such as 5-10 minutes, when the vehicle 102 may be traveling in the host lane monitoring zone or the adjacent lane monitoring zone. The short term assessments facilitates in the identification of short term driver fatigue, and the long term assessment facilitates in the identification of long-term driving behavior.

To perform the short term assessments and the long term assessments, the processor 242 may obtain information associated with the road network 104 from the server 202 or the memory 244. The information may include information associated with the road curvature (e.g., host lane curvature), Closest In-Path Vehicle (CIPV), and/or the like. Responsive to obtaining the information, the processor 242 may calculate a short-term host lane threshold and a long-term host lane threshold based on the information, which may be part of the host lane threshold. In addition, the processor 242 may calculate a short-term adjacent lane threshold and a long-term adjacent lane threshold based on the information, which may be part of the adjacent lane threshold. The short-term host lane threshold or the short-term adjacent lane threshold may facilitate in or enable the identification of short-term vehicle driver fatigue, and the long-term host lane threshold or the long-term adjacent lane threshold may facilitate in or enable the identification of long-term driver behavior.

In some aspects, the short-term host lane threshold may be different from the short-term adjacent lane threshold, and the long-term host lane threshold may be different from the long-term adjacent lane threshold. For example, the processor 242 may calculate the short-term host lane threshold as "X1" minutes/seconds out of "Y1" minutes/seconds, long-term host lane threshold as "X2" minutes/seconds out of "Y2" minutes/seconds, short-term adjacent lane threshold as "X3" minutes/seconds out of "Y3" minutes/seconds, and long-term adjacent lane threshold as "X4" minutes/seconds out of "Y4" minutes/seconds. In some aspects, "Y2" may be greater than "Y1", and "Y4" may be greater than "Y3".

Responsive to the thresholds calculation as described above, the processor 242 may compare the first time duration with the short-term host lane threshold and the long-term host lane threshold, or the second time duration with the short-term adjacent lane threshold and the long-term adjacent lane threshold. Based on the comparison, the processor 242 may determine the first confidence level. The first confidence level may be high when the first time duration may be greater than the short-term host lane threshold or the long-term host lane threshold, or when the second time duration may be greater than the short-term adjacent lane threshold or the long-term adjacent lane threshold. For example, the first confidence may be high (or the vehicle driver 112 may be drowsy) when the vehicle driver 112 spends 1.5 minutes out of 2 minutes in the host lane monitoring zone. As described above, the processor 242 may issue the drowsiness associated notification when the first confidence level is high.

In some aspects, responsive to outputting/issuing the drowsiness associated notification at step 320, the processor 242 may monitor real-time driving behavior. At step 322, the processor 242 may determine if the good driving conditions are met based on the monitoring. Stated another way, the processor 242 may determine if the vehicle driver 112 has rectified the driving behavior after viewing/receiving the drowsiness associated notification (or the first drowsiness associated notification). For example, the processor 242 may obtain the first input and determine whether the vehicle 102 is still oscillating within the host lane 108 or the vehicle 102 is straddling the adjacent lane 110 while being in the host lane 108.

At step 324, the processor 242 may issue a new notification (or the second drowsiness associated notification) responsive to a determination that the good driving conditions are not met (or the vehicle driver 112 has not rectified the driving behavior after viewing/receiving the first drowsiness associated notification). In some aspects, the processor 242 may issue the second drowsiness associated notification after a predetermined time duration (e.g., 15 minutes) of issuing the first drowsiness associated notification, to prevent issuance of multiple notifications/alerts simultaneously.

On the other hand, when the processor 242 determines that the good driving conditions are met at step 320, the processor 242 may reset notification/alert at step 326. Specifically, the processor 242 may suppress the alert when the suppression threshold is reached (e.g., within 10-15 minutes), or when the processor 242 determines that the vehicle driver 112 has rectified the driving behavior.

Figure 4:
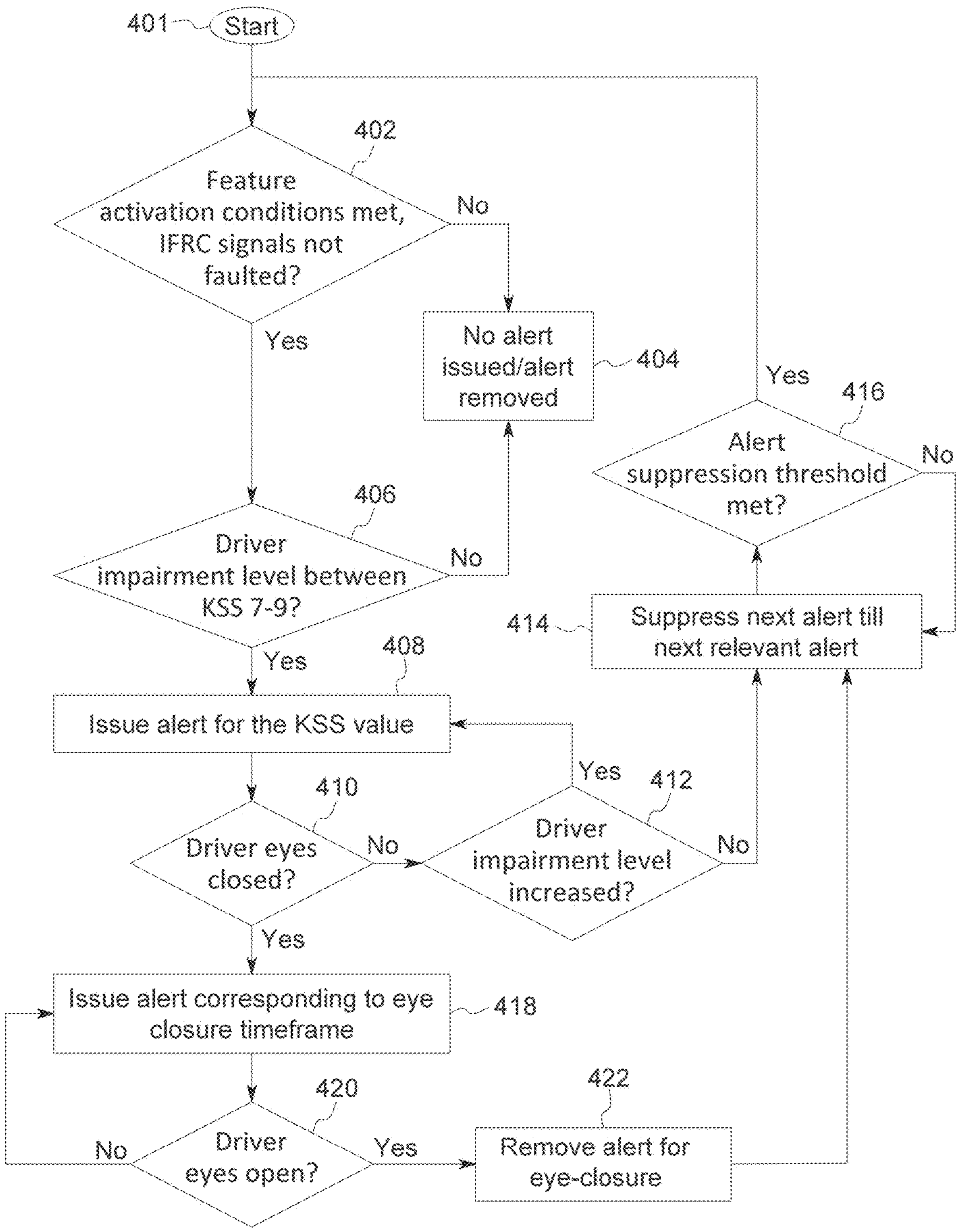
FIG. 4 depicts a flow diagram of a second method to detect driver's drowsiness using a second driver drowsiness detection unit, in accordance with the present disclosure.

In a similar manner, to determine the second confidence value (described above) based on the second input, the processor 242 may obtain the second input and monitor the driver's facial cues and body position based on the second input. Based on the monitoring, the processor 242 may provide notifications to the vehicle driver 112, as shown in FIG. 4. The steps shown in FIG. 4 may start at step 401. In some aspects, at step 402, the processor 242 may determine whether the feature activation condition is met or IFRC signals are not faulted. Responsive to a determination that the feature activation condition is not met or the IFRC signals are faulted, the processor 242 may not issue any alert notification or remove the alert notification (e.g., any existing alert notification that may be getting output), as shown in step 404.

On the other hand, responsive to a determination that the feature activation condition is met or the IFRC signals are not faulted, the processor 242 may determine the impairment level or a drowsiness level based on the second input as described above. In some aspects, the processor 242 may determine the impairment level by using Karolinska Sleepiness Scale (KSS). For example, when the KSS level is 1, the processor 242 may determine that the vehicle driver 112 is extremely alert. Similarly, when the KSS level is between 7-9, the processor 242 may determine that the vehicle driver 112 is drowsy, very drowsy, or asleep.

In some aspects, the processor 242 may obtain the second input, and determine the impairment level (e.g., a first impairment level) associated with the vehicle driver 112 based on the second input. Responsive to determining the first impairment level, the processor 242 may compare the first impairment level with a predetermined threshold value, and determine the second confidence level associated with the second input based on the comparison. The second confidence level may be high when the first impairment level exceeds the predetermined threshold value (e.g., having KSS level greater than 6).

In some aspects, responsive to determining the first impairment level, the processor 242 may determine whether the first impairment level is between KSS 7-9, as shown in step 406. Responsive to a determination that the first impairment level is not between the KSS 7-9, the processor 242 move not issue any alert notification or remove the alert notification, as shown in step 404. On the other hand, when the processor 242 determines that the first impairment level is between KSS 7-9, the processor 242 may output the notification/alert (e.g., the first drowsiness associated notification) on the infotainment system 236, as shown in step 408. In some aspects, the second confidence level may be high when the first impairment level is between KSS 7-9. After issuing the first drowsiness associated notification, the processor 242 may continue to monitor the driver's facial cues and body position based on the second input.

In further aspects, the processor 242 may determine if the driver's eyes are closed for a first predetermined time duration (e.g., for 3 seconds) based on the second input (e.g., after issuing the first drowsiness associated notification), as shown in step 410. Responsive to a determination that the driver's eyes are not closed, the processor 242 may determine if the driver impairment level has increased, at step 412. Specifically, the processor 242 may obtain the second input again, and determine a second impairment level based on the obtained second input. The processor 242 may then compare the second impairment level with the first impairment level, and then determine whether the second impairment level is greater than the first impairment level. Responsive to a determination that the impairment level has increased (or the second impairment level is greater than the first impairment level), the processor 242 may issue/output another alert (e.g., the second drowsiness associated notification), as shown in step 408. In some aspects, the processor 242 may select the second drowsiness associated notification, from the plurality of notifications, based on the second impairment level. In some aspects, the second drowsiness associated notification may be different from the first drowsiness associated notification. For example, the chime volume associated with the second drowsiness associated notification may be greater than the chime volume associated with the first drowsiness associated notification.

On the other hand, responsive to a determination that the impairment level has not increased (or the second impairment level is less than or equivalent to the first impairment level), the processor 242 may suppress issuance of next/subsequent alert notification till a next relevant alert, as shown in step 414. At step 416, the processor 242 may determine if the suppression threshold or the alert suppression threshold met. Responsive to a determination that the alert suppression threshold is met, the processor 242 may perform the step 402. Alternatively, the processor 242 may suppress the subsequent alert till the next relevant alert, as shown in step 414.

When the processor 242 determines that the driver's eyes are closed based on the second input (e.g., after issuing the first drowsiness associated notification) at the step 410, the processor 242 may instantly issue another alert/notification corresponding to an eye closure timeframe, as shown in step 418. For example, the processor 242 may output a continuous chime notification when the driver's eyes are closed for 3 seconds.

In some aspects, after issuing the alert/notification corresponding to the eye closure timeframe, the processor 242 may determine whether the driver's eyes are open, as shown in step 420. Responsive to a determination that the driver's eyes are not open, the processor 242 may issue/output another alert. Alternatively, responsive to a determination that the driver's eyes are open, the processor 242 may remove the alert as shown in step 422, and may suppress the next alert as shown in step 414.

In further aspects, the detection units 246 may include the driver attention detection unit that may be configured to detect whether the vehicle driver 112 may be distracted while driving the vehicle 102. The driver attention detection unit may use the driver facing camera 116 to capture the third input associated with the driver facial cues and body position.

In some aspects, the processor 242 may be configured to obtain the third input from the driver attention detection unit, and may correlate the first input, the second input, and the third input. Based on the correlation of the first input, the second input, and the third input, the processor 242 may determine whether the vehicle driver 112 may be drowsy or distracted while driving the vehicle 102. Stated another way, the processor 242 may identify whether the vehicle driver 112 may be sleepy or distracted based on the correlation of the first input, the second input, and the third input.

In some aspects, the processor 242 may select the drowsiness associated notification, from the plurality of notifications, responsive to determining that the vehicle driver 112 may be drowsy, as described above. For example, the processor 242 may select message "take a break as you are drowsy" and chime 1 at low volume. Alternatively, the processor 242 may select a distracted associated notification, from the plurality of notifications, responsive to determining that the vehicle driver 112 may be distracted. For example, the processor 242 may select the notification "watch the road" and continuous chime 2. Responsive to the selection of the drowsiness associated notification or the distracted associated notification, the processor 242 may output the selected notification.

In further aspects, the processor 242 may obtain the information associated with the vehicle driver's historical behavior from the server 202 or the memory 244. The driver historical behavior information may include information associated with historical notifications that may have been outputted for the vehicle driver 112 in the past. Responsive to obtaining the driver historical behavior information, the processor 242 may correlate the driver historical behavior information with the first input, the second input, and the third input, and determine that the vehicle driver may be drowsy or distracted based on the correlation of the driver historical behavior with the first input, the second input, and the third input. For example, the processor 242 may determine that the vehicle driver 112 generally drives in the host lane monitoring zone based on the driver historical behavior. Responsive to such determination, the processor 242 may determine that the vehicle driver 112 may not be drowsy when the vehicle driver 112 drives the vehicle 102 on the host lane monitoring zone for a longer time duration.

Figure 5:
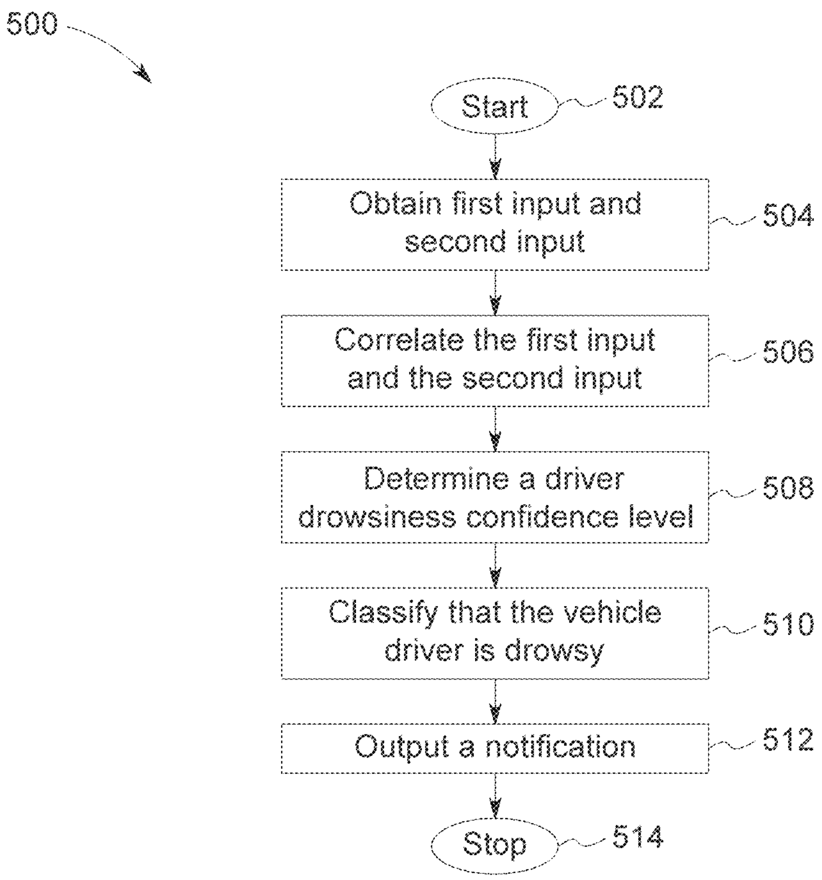
FIG. 5 depicts a flow diagram of a third method to detect driver's drowsiness in accordance with the present disclosure.

FIG. 5 depicts a flow diagram of a method 500 to detect driver's drowsiness in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the processor 242, the first input from the first driver drowsiness detection unit, and the second input from the second driver drowsiness detection unit. The first driver drowsiness detection unit may be configured to capture the first input associated with the lane-based driving behavior associated with the vehicle driver 112, and the second driver drowsiness detection unit may be configured to capture the second input associated with the driver's facial cues and body position when the vehicle driver 112 may be driving the vehicle 102.

At step 506, the method 500 may include correlating, by the processor 242, the first input and the second input. At step 508, the method 500 may include determining, by the processor 242, the driver drowsiness confidence level based on the correlation of the first input and the second input. At step 510, the method 500 may include classifying, by the processor 242, that the vehicle driver 112 may be drowsy when the driver drowsiness confidence level is greater than the threshold confidence value. At step 512, the method 500 may include outputting, by the processor 242, a notification responsive to determining that the vehicle driver 112 may be drowsy.

The method 500 may end at step 514.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a first driver drowsiness detection unit configured to capture a first input associated with a lane-based driving behavior of a vehicle driver on a road network;

a second driver drowsiness detection unit configured to capture a second input associated with driver facial cues and body position; and a processor configured to:

correlate the first input and the second input;

determine a driver drowsiness confidence level based on the correlation of the first input and the second input;

classify that the vehicle driver is drowsy when the driver drowsiness confidence level is greater than a threshold confidence value;

output a first notification responsive to determining that the vehicle driver is drowsy;

determine that the vehicle is traveling in a host lane monitoring zone or an adjacent lane monitoring zone on the road network based on the first input;

calculate a first time duration for which the vehicle is traveling in the host lane monitoring zone or a second time duration for which the vehicle is traveling in the adjacent lane monitoring zone;

compare the first time duration with a host lane threshold or the second time duration with an adjacent lane threshold; and determine a first confidence level associated with the first input based on the comparison, wherein the first confidence level is high when the first time duration is greater than the host lane threshold or when the second time duration is greater than the adjacent lane threshold.

2. The vehicle of claim 1, wherein:

the host lane threshold comprises a short-term host lane threshold and a long-term host lane threshold, wherein:

the short-term host lane threshold enables an identification of a short-term fatigue of the vehicle driver, the long-term host lane threshold enables an identification of a long-term driver behavior, and the adjacent lane threshold comprises a short-term adjacent lane threshold and a long-term adjacent lane threshold, wherein:

the short-term adjacent lane threshold enables the identification of the short-term fatigue of the vehicle driver, the long-term adjacent lane threshold enables the identification of the long-term driver behavior.

3. The vehicle of claim 2, wherein the processor is further configured to:

obtain an information associated with the road network;

calculate the short-term host lane threshold, the long-term host lane threshold, the short-term adjacent lane threshold, and the long-term adjacent lane threshold based on the information;

compare the first time duration with the short-term host lane threshold and the long-term host lane threshold, or the second time duration with the short-term adjacent lane threshold and the long-term adjacent lane threshold; and determine the first confidence level associated with the first input based on the comparison.

4. The vehicle of claim 2, wherein the short-term host lane threshold is different from the short-term adjacent lane threshold, and the long-term host lane threshold is different from the long-term adjacent lane threshold.

5. The vehicle of claim 1, wherein the processor is further configured to:

determine a first impairment level associated with driver's drowsiness level, based on the second input;

compare the first impairment level with a predetermined threshold value; and determine a second confidence level associated with the second input based on the comparison.

6. The vehicle of claim 5, wherein the processor is further configured to:
correlate the first confidence level and the second confidence level; and
determine the driver drowsiness confidence level based on the correlation of the first confidence level and the second confidence level.

7. The vehicle of claim 5, wherein the processor is further configured to select the first notification, from a plurality of notifications, based on the first impairment level.

8. The vehicle of claim 7, wherein the processor is further configured to:
determine a second impairment level associated with driver's drowsiness level based on the second input, responsive to determining the first impairment level;
compare the first impairment level with the second impairment level;
determine that the second impairment level is greater than the first impairment level based on the comparison; and
output a second notification, from the plurality of notifications, responsive to determining that the second impairment level is greater than the first impairment level.

9. The vehicle of claim 8, wherein the processor is further configured to:
determine that the second impairment level is less than or equivalent to the first impairment level based on the comparison; and
suppress issuance of a subsequent notification after outputting the first notification, responsive to determining that the second impairment level is less than or equivalent to the first impairment level.

10. The vehicle of claim 8, wherein the processor is further configured to:
determine that driver's eyes are closed for a first predetermined time duration based on the second input, responsive to outputting the second notification; and
output a third notification, from the plurality of notifications, responsive to determining that the driver's eyes are closed for the first predetermined time duration.

11. The vehicle of claim 10, wherein the first notification is different from the second notification, and wherein the third notification is different from the first notification and the second notification.

12. The vehicle of claim 10 further comprising a driver attention detection unit configured to capture a third input associated with the driver facial cues and body position.

13. The vehicle of claim 12, wherein the processor is further configured to:
obtain the third input from the driver attention detection unit;
correlate the first input, the second input, and the third input;
determine that the vehicle driver is drowsy or distracted based on the correlation of the first input, the second input, and the third input;
select the first notification, from the plurality of notifications, responsive to determining that the vehicle driver is drowsy, or a fourth notification, from the plurality of notifications, responsive to determining that the vehicle driver is distracted; and
output the first notification or the fourth notification based on the selection.

14. The vehicle of claim 13, wherein the processor is further configured to:
obtain driver historical behavior associated with the vehicle driver, wherein the driver historical behavior comprises information associated with historical notifications outputted for the vehicle driver; and
correlate the driver historical behavior with the first input, the second input, and the third input; and
determine that the vehicle driver is drowsy or distracted based on the correlation of the driver historical behavior with the first input, the second input, and the third input.

15. A method comprising:
obtaining, by a processor, a first input from a first driver drowsiness detection unit of a vehicle, and a second input from a second driver drowsiness detection unit of the vehicle, wherein the first driver drowsiness detection unit is configured to capture a first input associated with a lane-based driving behavior of a vehicle driver on a road network, and wherein the second driver drowsiness detection unit is configured to capture a second input associated with driver facial cues and body position;
correlating, by the processor, the first input and the second input;
determining, by the processor, a driver drowsiness confidence level based on the correlation of the first input and the second input;
classifying, by the processor, that the vehicle driver is drowsy when the driver drowsiness confidence level is greater than a threshold confidence value;
outputting, by the processor, a notification responsive to determining that the vehicle driver is drowsy;
determining that the vehicle is traveling in a host lane monitoring zone or an adjacent lane monitoring zone on the road network based on the first input;
calculating a first time duration for which the vehicle is traveling in the host lane monitoring zone or a second time duration for which the vehicle is traveling in the adjacent lane monitoring zone;
comparing the first time duration with a host lane threshold or the second time duration with an adjacent lane threshold; and
determining a first confidence level associated with the first input based on the comparison, wherein the first confidence level is high when the first time duration is greater than the host lane threshold, or when the second time duration is greater than the adjacent lane threshold,
wherein the host lane threshold comprises a short-term host lane threshold and a long-term host lane threshold, wherein the short-term host lane threshold enables an identification of a short-term fatigue of the vehicle driver, wherein the long-term host lane threshold enables an identification of a long-term driver behavior, wherein the adjacent lane threshold comprises a short-term adjacent lane threshold and a long-term adjacent lane threshold, wherein the short-term adjacent lane threshold enables the identification of the short-term fatigue of the vehicle driver, and wherein the long-term adjacent lane threshold enables the identification of the long-term driver behavior.

16. The method of claim 15 further comprising:
obtaining an information associated with the road network;
calculating the short-term host lane threshold, the long-term host lane threshold, the short-term adjacent lane threshold, and the long-term adjacent lane threshold based on the information;
comparing the first time duration with the short-term host lane threshold and the long-term host lane threshold, or the second time duration with the short-term adjacent lane threshold and the long-term adjacent lane threshold; and determining the first confidence level associated with the first input based on the comparison, wherein the first confidence level is high when the first time duration is greater than the short-term host lane threshold or the long-term host lane threshold, or when the second time duration is greater than the short-term adjacent lane threshold or the long-term adjacent lane threshold.

17. The method of claim 16 further comprising:

determining a first impairment level associated with the vehicle driver based on the second input;

comparing the first impairment level with a predetermined threshold value;

determining a second confidence level associated with the second input based on the comparison, wherein the second confidence level is high when the first impairment level exceeds the predetermined threshold value;

correlating the first confidence level and the second confidence level; and determining the driver drowsiness confidence level based on the correlation of the first confidence level and the second confidence level.

18. A non-transitory computer-readable storage medium having instructions stored thereupon which, when executed by a processor, cause the processor to:

obtain a first input from a first driver drowsiness detection unit of a vehicle, and a second input from a second driver drowsiness detection unit of the vehicle, wherein the first driver drowsiness detection unit is configured to capture a first input associated with a lane-based driving behavior of a vehicle driver on a road network, and wherein the second driver drowsiness detection unit is configured to capture a second input associated with driver facial cues and body position;

correlate the first input and the second input;

determine a driver drowsiness confidence level based on the correlation of the first input and the second input;

classify that the vehicle driver is drowsy when the driver drowsiness confidence level is greater than a threshold confidence value;

output a notification responsive to determining that the vehicle driver is drowsy;

determine that the vehicle is traveling in a host lane monitoring zone or an adjacent lane monitoring zone on the road network based on the first input;

calculate a first time duration for which the vehicle is traveling in the host lane monitoring zone or a second time duration for which the vehicle is traveling in the adjacent lane monitoring zone;

compare the first time duration with a host lane threshold or the second time duration with an adjacent lane threshold; and determine a first confidence level associated with the first input based on the comparison, wherein the first confidence level is high when the first time duration is greater than the host lane threshold or when the second time duration is greater than the adjacent lane threshold.

* * * * *